May 24, 1938.  R. V. FORD  2,118,300

VALVE AND PACKAGING CARTRIDGE

Filed Aug. 20, 1937

INVENTOR.
ROBERT V. FORD
BY
Lippincott & Metcalf
ATTORNEYS.

Patented May 24, 1938

2,118,300

UNITED STATES PATENT OFFICE 2,118,300

VALVE AND PACKING CARTRIDGE

Robert V. Ford, San Francisco, Calif.

Application August 20, 1937, Serial No. 160,118

7 Claims. (Cl. 251—31)

My invention relates to a valve, and more particularly to a valve incorporating a removable packing cartridge, adapted to withstand high pressures.

This application is a re-filing in part of original application, Serial No. 42,024, filed September 25, 1935, for "Valves".

Among the objects of my invention are: To provide a valve having a packing cartridge that is removable as a whole; to provide a high pressure seal in a valve; to provide a packing gland without rotating parts; to provide a resilient packing cartridge for a valve; to provide a valve and a removable packing cartridge therefor which is particularly adapted for use with high pressures; to provide a valve automatically compensating for temperature changes; and to provide a simple, efficient valve, utilizing a unitary and removable packing gland.

My invention possesses numerous other objects and features of advantage, some of which, together with the foregoing, will be set forth in the following description of specific apparatus embodying and utilizing my novel method. It is therefore to be understood that my method is applicable to other apparatus, and that I do not limit myself, in any way, to the apparatus of the present application, as I may adopt various other apparatus embodiments, utilizing the method, within the scope of the appended claims.

Figure 1:
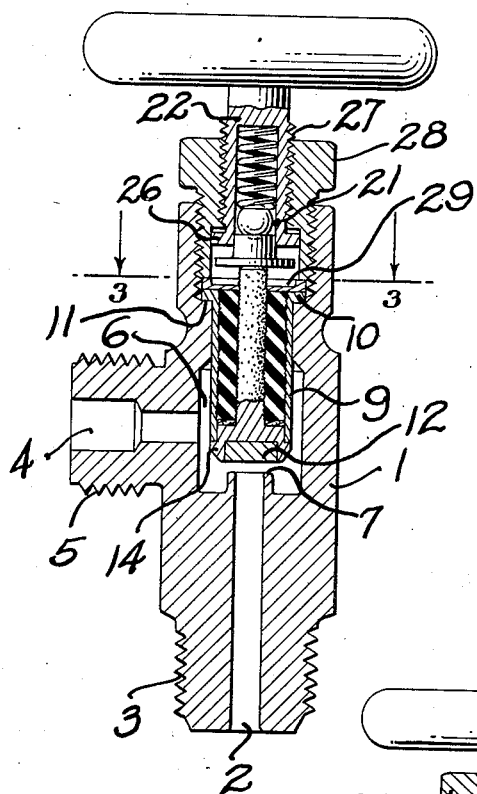
Fig. 1 is a vertical cross-sectional view through a valve constructed in accordance with my invention, showing the valve in open position.

My invention may be more fully understood by direct reference to the drawing.

Figure 2:
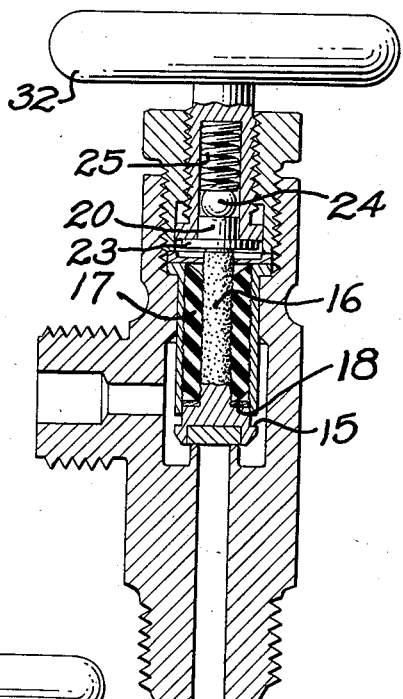
Fig. 2 is a view, similar to Fig. 1, showing the valve in closed position.

In Figs. 1 and 2, a valve body 1 is provided with the usual inlet channel 2 surrounded by threaded inlet walls 3, and an outlet channel 4 surrounded by threaded outlet walls 5. Connecting the two channels is a valve chamber 6 into which projects a valve seat 7. Extending into the valve chamber 6 is a cylindrical unitary packing gland or cartridge comprising an exterior shell 9, preferably of metal, and having a peripheral lip 10 on the upper end thereof fitting against a valve body shoulder 11 on the main body of the valve.

Immediately above the valve seat 7 is a valve face block 12, which may be of any desired material, such as lead, fiber, or other material suitable for use with the particular gases or liquid it is desired to control with the valve. This valve block 12 is inserted into and carried by a piston 14, a portion of which slides freely in and cooperates closely with shell 9, and this piston is also provided with a piston shoulder 15 extending over the open lower end of shell 9.

I prefer to grind or otherwise smooth the joint between the piston shoulder and the end of shell 9 so that when the piston is retracted into the shell as far as possible, a gas-tight seal is formed. The piston 14 is provided with a valve stem 16 extending axially through the cylindrical shell 9, and terminating above the peripheral lip 10.

I prefer to slightly roughen the interior of shell 9 above that portion bearing against piston 14, and also to roughen the exterior surface of the valve stem 16, and to fill the open space between the shell and the valve stem 16 with a resilient material 17 which is bonded to both the valve stem and the shell 9. The roughening may be dispensed with when a proper bond may be obtained without it.

One resilient material that I have found satisfactory is rubber, placed in the shell in unvulcanized position and then bonded to the shell and valve stem by vulcanization. Other methods and other resilient materials will be apparent to those skilled in the art, and where only a short travel is utilized, certain resilient materials bonded with heat-resistant cement may be utilized. In all cases, however, I prefer not to allow the resilient material to bond to the top of piston 14, and to prevent this I insert directly over the top of the piston a washer 18, preferably also of resilient material, and I have found that cellophane, or similar materials, are satisfactory, although paper or thin fiber will also serve.

In order to operate valve stem 16, I position directly above the end of the valve stem, an operating sleeve 20 sliding in a recess 21 in a valve handle extension 22, and having thereon a laterally extending flange 23 immediately above the end of valve stem 16. A ball 24 contacts the operating sleeve and is forced thereagainst by a spring 25, both being within recess 21. The inner end of the valve handle extension is provided with a valve handle extension flange 26, and the extension is provided with extension threads 27 cooperating with similar threads in a lock nut 28, the latter being threaded to valve body 1 and extending inwardly to bear against a positioning washer 29 set directly on peripheral lip 10 of the shell 9 of the cartridge, this positioning washer having radial arms 30 extending inwardly to an annular ring 31 surrounding the valve stem to maintain the latter in central position. I do not, however, wish to be limited in any way to the use of this washer, as there are resilient materials which are sufficiently strong in themselves to prevent such lateral displacement; nor do I desire to be limited to the use of this washer as extending across the top of the lip 10.

Figure 4:
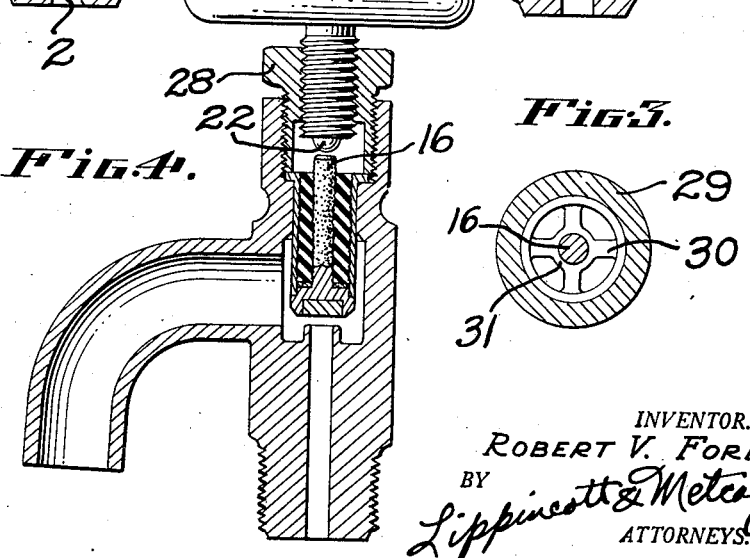
Fig. 4 is a sectional view of another embodiment of my invention.
Figure 3:
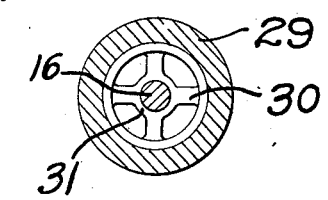
Fig. 3 is a sectional view taken as indicated by line 3—3 in Fig. 1.

In its simplest form, and for low pressure valves, such a washer may well be dispensed with, as shown in Fig. 4, later described. In any case, the lock nut 28 may bear either directly against or through the medium of the positioning washer 29 to seal the lip 10 of the cartridge in place without leakage, with direct metal-to-metal contact. The valve handle extension 22 is operated by the usual valve handle 32.

The operation of the valve, in Figs. 1 and 2, is clearly shown by comparing Fig. 1, indicating the open position of the valve, with Fig. 2, showing the closed position. When handle 32 is turned, the handle extension 22 travels toward the interior of the valve due to the threads 27. The resiliency of the packing material 17 resists motion of the valve stem 16 at first, and spring 25 is compressed and this spring pressure is built up until the pressure is sufficient to overcome the resiliency of the packing material. The packing material distorts, and allows the valve stem to move the piston 14 out of the sleeve 9 and force the valve face 12 against seat 7.

When the spring 25 is properly designed in weight, this closing of the valve will take place before handle extension flange 26 contacts the operating sleeve flange 23, and after the valve is closed no further movement of the valve stem and piston will occur, but the handle 30 may still be rotated until flanges 23 and 26 come in firm contact with each other to positively lock the valve in closed position. If, however, at any time thereafter temperature changes take place, whereby the parts should contract so that this positive lock is removed, the full pressure of the spring will still be exerted to maintain the valve closed thus preventing leakage under extreme changes of temperature. When it is desired to open the valve the rotation of the handle 32 is reversed; the positive lock will first be broken, and then pressure will be gradually taken from the valve stem by the removal of the compression of the spring 25. The resiliency of the packing material will then return the valve to its normal open position.

Inasmuch as the external shell of the packing gland or cartridge is firmly sealed to the valve body so that no leakage may take place at that point, and inasmuch as the resilient material is bonded to both the shell and to the valve stem, it is obvious that there can be no leakage past the valve stem and out through the operating mechanism. The device is therefore well adapted to withstand high valve chamber pressure, such as would occur when the valve is applied to compressed gas tanks where the pressure reduction devices are positioned on the outlet side of the valve.

Furthermore, it will be obvious that by the removal of the lock nut 28 the operating mechanism may be completely removed, and the packing gland withdrawn from the valve chamber 6 and a new one inserted at any time.

It is also important to note that in a simple form, as shown in Fig. 4, such as would be used in conjunction with relatively low pressure, the spring 25 and operating sleeve 20 may be dispensed with and the cartridge removably inserted and sealed, utilizing the lock nut 28, and with just the end of valve handle extension 22 bearing on the end of valve stem 16. The contact between the valve stem and the valve handle extension may well be of small area in this case, so that there will be no tendency for the valve stem 16 to rotate.

I claim:

1. A packless valve including a valve body having a valve chamber therein, and inlet and outlet passages communicating with said chamber, a vertically disposed hollow shell in said chamber, a valve in said chamber to close off the inlet from the outlet, said valve having a stem thereon, a yieldable elastic packing material sealed to the side walls of said shell and to the valve stem, said packing tending to keep the valve off the inlet, and means rotatably mounted on the valve body and related to the valve stem to move the valve into contact with the inlet.

2. A packless valve including a valve body having a valve chamber therein, and inlet and outlet passages communicating with said chamber, a vertically disposed hollow shell in said chamber, a valve in said chamber to close off the inlet from the outlet, said valve having a stem thereon, a yieldable elastic packing material sealed to the side walls of said shell and to the valve stem, said packing tending to keep the valve off the inlet, means rotatably mounted on the valve body and related to the valve stem to move the valve into contact with the inlet, said valve including a spring actuated insert to close off said inlet when the valve handle is in the partially open position and the gas pressure in the inlet is less than the pressure of the spring on the insert.

3. A packless valve including a valve body having a valve chamber therein, and inlet and outlet passages communicating with said chamber, a vertically disposed hollow shell in said chamber, a valve in said chamber to close off the inlet from the outlet, said valve having a stem thereon, rubber packing vulcanized to the side walls of said shell and to the valve stem, said packing being yieldable in a direction parallel to the axes of the shell and valve to resist movement of the valve toward the inlet from a selected position of rest, and to restore said valve to said selected position of rest from its position for engaging said inlet, and means rotatably mounted on the valve body and related to the valve stem to move the valve into contact with the inlet.

4. A packless valve including a valve body having a valve chamber therein, and inlet and outlet passages communicating with said chamber, a vertically disposed hollow shell in said chamber, a valve in said chamber to close off the inlet from the outlet, said valve having a stem thereon, rubber packing vulcanized to the side walls of said shell and to the valve stem, said packing being yieldable in a direction parallel to the axes of the shell and valve to resist movement of the valve toward the inlet from a selected position of rest and to restore said valve to said selected position of rest from its position for engaging said inlet, a shaft rotatably mounted on said valve body, and an expansion spring interposed between said shaft and valve stem to translate the rotary movement of the shaft into reciprocative movement of the valve, said spring being yieldable to compensate for wear created on the face of the valve by the inlet.

5. A packless valve including a valve body having a valve chamber therein, and inlet and outlet passages communicating with said chamber, a vertically disposed hollow shell in said chamber, a valve in said chamber to close off the inlet from the outlet, said valve having a stem thereon, rubber packing vulcanized to the side walls of said shell and to the valve stem, said packing tending to keep the valve off the inlet, means rotatably mounted on the valve body and related to the valve stem to move the valve into contact with the inlet, and a spring interposed between said means and valve stem to compensate for wear created on the face of the valve by the inlet.

6. A packless valve including a valve body having a valve chamber therein, and inlet and outlet passages communicating with said chamber, a vertically disposed and removable hollow shell in said chamber and having a peripheral shoulder thereon bearing against said body, a valve in said chamber to close off the inlet from the outlet, said valve thereon extending through said shell, a yieldable elastic packing material bonded to the inner side wall of said shell and to said valve stem, the elasticity of said material tending to keep said valve off said inlet, means rotatably mounted on said valve body and bearing on said valve stem to move said valve into contact with said inlet, and an annular sealing nut threaded to said body and bearing against said shoulder to lock said shell to said body.

7. In combination with a valve body having a chamber therein and inlet and outlet passages communicating with said chamber, a removable packing cartridge comprising a hollow shell having a peripheral shoulder thereon engaging said body, a valve slidably engaging one end of said shell and positioned over said inlet, a valve stem connected to said valve and extending through said shell, a body of yieldable elastic material bonded to the side walls of said shell and to said stem, said material normally holding said valve away from said inlet, operating means attached to said body and movable to bear on the terminus of said stem to cause said material to yield sufficiently to close said inlet by said valve, and removable means bearing against said shoulder and said body to lock said cartridge in said body and to permit removal thereof.

ROBERT V. FORD.